United States Patent
Tseng et al.

(10) Patent No.: US 9,013,540 B2
(45) Date of Patent: Apr. 21, 2015

(54) METHOD FOR SWITCHING SHARED CONTENT IN A VIDEO CONFERENCE AND A VIDEO CONFERENCE SYSTEM

(71) Applicant: Quanta Computer Inc., Kuei Shan Hsiang, Tao Yuan Shien (TW)

(72) Inventors: Wen-Jui Tseng, Tao Yuan Shien (TW); Jr-Hau Jhang, Tao Yuan Shien (TW); Cheng-Yuan Chiu, Tao Yuan Shien (TW); Yang-Sheng Wang, Tao Yuan Shien (TW)

(73) Assignee: Quanta Computer Inc., Guishan Dist., Taoyuan (TW)

( * ) Notice: Subject to any disclaimer, the term of this patent is extended or adjusted under 35 U.S.C. 154(b) by 415 days.

(21) Appl. No.: 13/675,471

(22) Filed: Nov. 13, 2012

(65) Prior Publication Data
US 2013/0194376 A1    Aug. 1, 2013

(30) Foreign Application Priority Data
Jan. 31, 2012  (TW) ............................... 101103028 A (51) Int. Cl.
*H04N 7/14* (2006.01)
*H04N 7/15* (2006.01)

(52) U.S. Cl.
CPC ...................................... *H04N 7/15* (2013.01)

(58) Field of Classification Search
USPC ................... 348/14.01–14.16; 370/259–271, 370/351–357
See application file for complete search history.

(56) References Cited

U.S. PATENT DOCUMENTS

| | | | | |
|---|---|---|---|---|
| 5,107,443 | A | * 4/1992 | Smith et al. | 715/751 |
| 2003/0074404 | A1 | * 4/2003 | Parker et al. | 709/204 |
| 2010/0037151 | A1 | * 2/2010 | Ackerman et al. | 715/753 |

* cited by examiner

*Primary Examiner* — Hemant Patel
(74) *Attorney, Agent, or Firm* — McClure, Qualey & Rodack, LLP (57) ABSTRACT

A method for switching shared content in a video conference includes determining a status of the video conference when a switch event is triggered. If the status is a video status, sharable content of the sharing terminal are detected, and whether the sharing terminal has at least one sharable content is determined. If so, one of at least one sharable content is shared with at least one remote terminal. If not, the status keeps being in the video status. If the status is a sharing status and the sharing terminal shares a content having a first index number, sharable content of the sharing terminal are detected, and whether the sharing terminal has a first sharable content having an index number larger than the first index number is determined. If so, sharing the first sharable content with at least one remote terminal by the sharing terminal.

10 Claims, 5 Drawing Sheets

METHOD FOR SWITCHING SHARED CONTENT IN A VIDEO CONFERENCE AND A VIDEO CONFERENCE SYSTEM

CROSS REFERENCE TO RELATED APPLICATIONS

This application claims priority of Taiwan Patent Application No. 101103028, filed on Jan. 31, 2012, the entirety of which is incorporated by reference herein.

BACKGROUND OF THE INVENTION

1. Field of the Invention

The invention relates to a video conference, and more particularly to switching shared content in a video conference.

2. Description of the Related Art

In a conventional video conference, terminals share images captured by video cameras with each other to establish a video conference. When a sharing terminal wants to share content other than images captured by a video camera (such as document files or presentation files opened on a main screen of the sharing terminal, a screen picture of the main screen, a screen picture of a secondary screen of the sharing terminal, and so on) with other terminals, known technologies are not able to provide a convenient and fluent solution.

Moreover, if a connection between a host and a screen fails, sharing the screen picture of the screen would be interrupted. The screen of the sharing terminal has to be manually connected to the host or the sharing source has to be switched through a switch, and thus the video conference may continue. Therefore, in the conventional video conference, the problem described above may occur when the sharing terminal shares content other than the images captured by the video camera with other terminals, and therefore the video conference may be interrupted or falter.

BRIEF SUMMARY OF THE INVENTION

In view of this, the invention provides a method for switching shared content in a video conference to quickly and fluently switch shared content by automatically detecting sharable content through a corresponding switching flow so as to improve the efficiency of the video conference.

An embodiment of the invention provides a method for switching shared content in a video conference, comprising: determining a status of the video conference when a sharing terminal triggers a switch event in the video conference; if the status is a video status, detecting sharable content of the sharing terminal, and determining whether the sharing terminal has at least one sharable content, if so, sharing one of at least one sharable content with at least one remote terminal in the video conference by the sharing terminal, if not, making the status remain the video status; and if the status is a sharing status and the sharing terminal shares a content having a first index number, detecting sharable content of the sharing terminal, and determining whether the sharing terminal has a first sharable content having an index number larger than the first index number, if so, sharing the first sharable content with at least one remote terminal by the sharing terminal.

Another embodiment of the invention provides a video conference system, comprising a sharing terminal and at least one remote terminal, wherein the sharing terminal and at least one remote terminal are connected to each other through a network to perform a video conference, wherein the sharing terminal comprises: a user interface module, wherein a user operates the video conference system through the user interface module; a network module, coupled to the network; a video/audio source module, coupled to a video camera and/or a microphone; a display module, coupled to at least one display device; and a sharing module, retrieving video signals captured by the video camera and/or audio signals received by the microphone through the video/audio source module and retrieving a display content displayed on at least one display device through the display module, wherein the sharing module has a video status and a sharing status, and when in the video status, the sharing module shares the retrieved video signals with at least one remote terminal via the network through the network module, and when in the sharing status, the sharing module shares the retrieved display content with at least one remote terminal through the network, wherein an index number of the display content is a first index number; wherein when the user interface module receives a switch event, the sharing module determines the status of the sharing module, if the status is the video status, the sharing module detects sharable content of the display module and determines whether the display module has at least one sharable content, if so, the sharing module shares one of at least one sharable content with at least one remote terminal through the network, if not, the sharing module keeps in the video status, and if the status is the sharing status, the sharing module detects sharable content of the display module and determines whether there is a first sharable content having an index number larger than the first index number, and if so, the sharing module shares the first sharable content with at least one remote terminal through the network.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
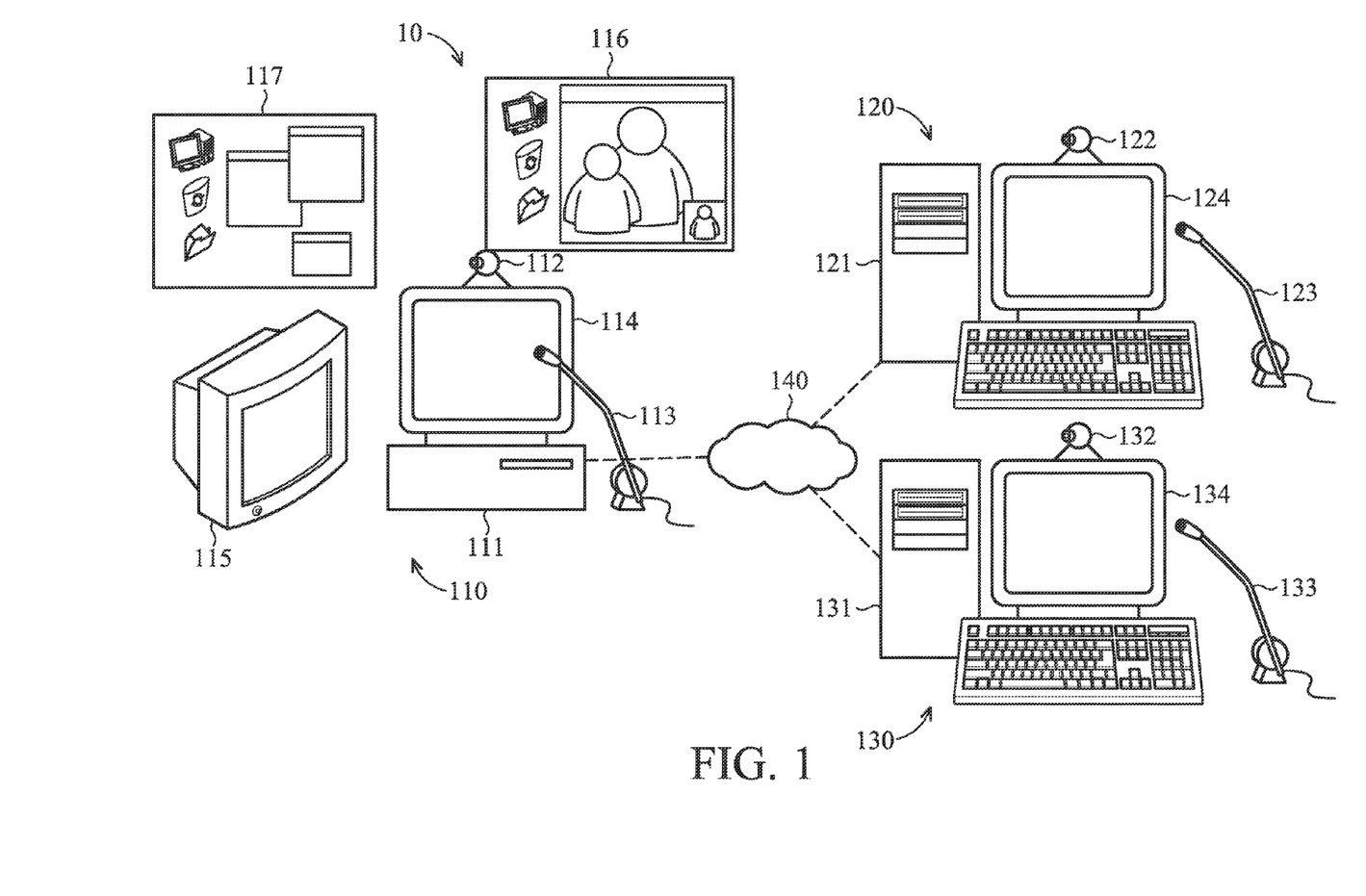
FIG. 1 is a block diagram of a video conference system.

FIG. 1 is a block diagram of a video conference system 10. The video conference system 10 comprises a sharing terminal (host terminal) 110, a first remote terminal 120, a second remote terminal 130 and a network 140. The sharing terminal 110, the first remote terminal 120 and the second remote terminal 130 connect to each other through the network 140 so as to perform a video conference. The number of sharing terminals and the number of remote terminals are only exemplary and the invention is not limited thereto. Note that any participant (terminal) in the video conference could be a sharing terminal or a remote terminal. The configuration in FIG. 1 is used for concisely explaining an embodiment of the invention.

In one example, the sharing terminal 110 comprises a computer 111, a video camera 112, a microphone 113, a first screen (main screen) 114 and an optionally second screen 115. The first remote terminal 120 comprises a computer 121, a video camera 122, a microphone 123 and a screen 124. The second remote terminal 130 comprises a computer 131, a video camera 132, a microphone 133 and a screen 134. In another example, the sharing terminal 110, the first remote terminal 120 or the second remote terminal 130 may be a personal digital assistant (PDA), a mobile phone, a notebook or another electronic apparatus that can perform a video conference. In one embodiment, the second screen 115 is a projector or an additional display.

Figure 2:
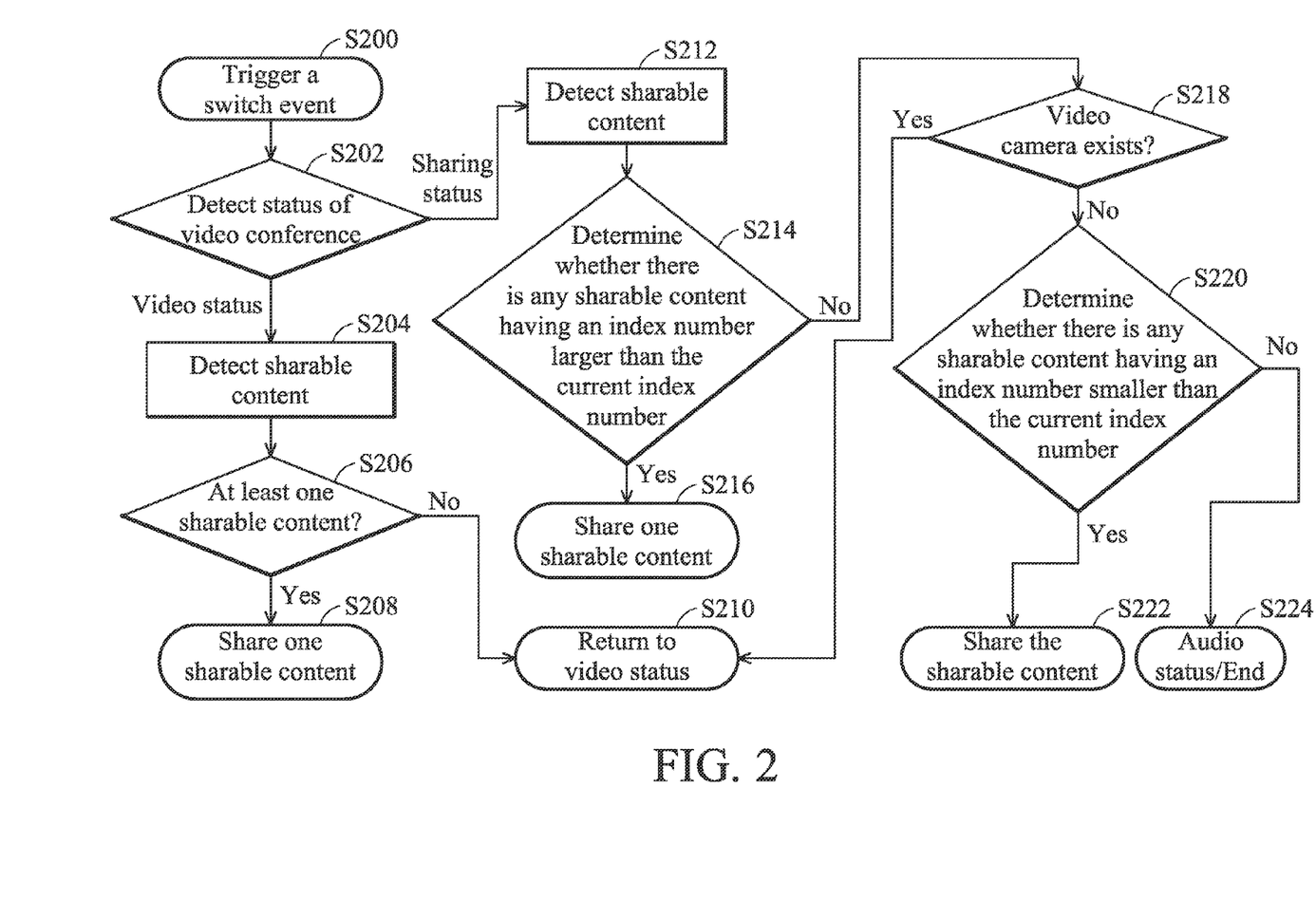
FIG. 2 is a flow chart of a method for switching shared content in a video conference according to an embodiment of the invention.

FIG. 2 is a flow chart of a method for switching shared content of the sharing terminal 110 in a video conference according to an embodiment of the invention. In the video conference, the sharing terminal 110 transmits video signals (video frames) captured by the video camera 112 and audio signals captured by the microphone 114 to the first remote terminal 120 and the second remote terminal 130 through the network 140. Therefore, the first remote terminal 120 and the second remote terminal 130 may receive images of user/users in front of the video camera 112, and thus the video conference proceeds. The condition described above is defined as the video status of the video conference. When the sharing terminal 110 changes from sharing the video frames with the first remote terminal 120 and the second remote terminal 130 to sharing sharable content (such as a screen picture 116 of the first screen 114 or a screen picture 117 of the second screen 115) with the first remote terminal 120 and the second remote terminal 130, or when the sharing terminal 110 changes from sharing the sharable content with the remote terminals to sharing different sharable content with the remote terminals, the sharing terminal 110 triggers a switch event, as shown in step S200. The condition where the sharing terminal 110 shares any sharable content is defined as the sharing status of the video conference.

In one embodiment, the sharing terminal 110 first performs scans on all sharable content and the video camera 112 and assigns an index number to each of sharable content so as to determine which sharable content is going to be shared after the switch event is triggered. In one preferred embodiment, an index number of sharable content is determined according the time when the sharable content is connected to the computer 111. Moreover, if one sharable content is removed, the index numbers of the other sharable content would be adjusted accordingly (a process that will be described in detail later).

For example, after the computer 111 is turned on, if only the video camera 112 and the first screen (main screen) 114 are connected to the computer 111, the index number of the video camera 112 is set to be 1 and the index number of the first screen (main screen) 114 is set to be 2. In another example, the index number of the video camera 112 is set to be 2 and the index number of the first screen (main screen) 114 is set to be 1. The index numbers may be set according to the requirements in practice. In the embodiment, the video camera 112 has the highest priority, and thus the index number of the video camera 112 is smaller than other sharable content. Therefore, after the computer 111 is turned on, the sharing terminal 110 will enter video status first through the video camera 112.

In one embodiment, in the sharing terminal 110, the switch event may be triggered by pressing a predetermined hot key (such as the right button of a mouse or a button on a keyboard or screen). In the specification, an example of sharable content may be a picture of the first screen 114 or the second screen 115, including a screen picture or pictures of windows, applications or extended desktops. For example, in the sharing terminal 110, a plurality of windows may be opened on the first screen 114 and an extended desktop may be displayed on the second screen 115. Then, the sharing terminal 110 may change from sharing the video frames with the remote terminals (in video status) to sharing a picture of one of the plurality of windows opened on the first screen 114 or a screenshot of the second screen 115 with the remote terminals (in the sharing status).

Then, in step S202, the status of the video conference is determined. If the status is the video status when the switch event is triggered, sharable content of the sharing terminal 110 is detected, as shown in step S204. As described above, an example of sharable content may be an image capture or a window from the first screen 114 or the second screen 115. Then in step S206, whether there is at least one sharable content in the sharing terminal 110 (that is, whether there is a picture or a window of the first screen 114 or the second screen 115 that is able to be shared with the remote terminals) is determined. If there is at least one sharable content in the sharing terminal 110 (Step S206: Yes), the sharing terminal 110 shares one sharable content with the first remote terminal 120 and the second remote terminal 130, as shown in step S208.

In one embodiment, sharable content having an index number which is one unit higher than the index number of the current shared content is shared with the remote terminals in step S208. For example, if the index number of the video camera 112 is 1, the index number of the first screen (main screen) 114 is 2 and the index number of the second screen 115 is 3, and the sharing terminal 110 would share sharable content having an index number which is one larger than the index number of the current shared content with the remote terminals in step S208. Since the sharing terminal 110 currently shares the images captured by the video camera 112 (in video status) and the index number of the video camera 112 is 1, therefore, the sharing terminal shares the sharable content having an index number of (1+1), that is, a picture of the first screen (main screen) 114 (whose index number is 2), with the remote terminals in step S208.

In step S206, if there is no sharable content in the sharing terminal (Step S206: No), such as when the computer 111 is only connected to the video camera 112, the video conference remains in video status, as shown in step S210. That is, the sharing terminal 110 keeps sharing the video frames with the first remote terminal 120 and the second remote terminal 130 through the network 140 without any change of status.

In step S202, if the status is the sharing status when the switch event is triggered (that is, a picture or a window of the first screen 114 having the index number of 2 or the second screen 115 having the index number of 3 is shared with the first remote terminal 120 and the second remote terminal 130), sharable content of the sharing terminal 110 is detected, as shown in step S212. Note that the current shared content also belongs to one of the sharable content in step S212. Then in step S214, whether there is any sharable content having an index number larger than the index number of the current shared content is determined. If there is sharable content having an index number larger than the index number of the current shared content (Step S214: Yes), the sharable content having the index number larger than the index number of the current shared content is shared with the first remote terminal 120 and the second remote terminal 130 as shown in step S216. After that, the method returns to step S200.

As described above, if the computer 111 is connected to the video camera 112 (whose index number is 1), the first screen (whose index number is 2) and the second screen 115 (whose index number is 3), when the sharing terminal 110 shares a picture of the first screen 114 in the sharing status as determined in step S202, two sharable content, including the picture of the first screen 114 (whose index number is 2) and a picture of the second screen 115 (whose index number is 3) are detected in step S212. In step S214, whether there is a sharable content having an index number larger than the index number of the current shared content is determined. In a preferred embodiment, the sharing terminal 110 determines whether there is a sharable content having an index number which is one larger than the index number of the current shared content. Since the index number of the current shared content (the picture of the first screen 114) is 2, and there is sharable content whose index number is 3 (2+1), the sharing terminal 110 shares the picture of the second screen 115 (whose index number is 3) with the remote terminals in step S216. After that, the method returns to step S200. In one embodiment, step S212 may be combined into step S214 to be performed together.

If there is no sharable content having an index number larger than the index number of the current shared content in step S214, whether the video camera 112 of the sharing terminal still exists is determined in step S218. If the video camera 112 exists (Step S218: Yes), the video conference returns to the video status as shown in step S210. That is, the sharing terminal 110 shares the video frames captured by the video camera 112 with the first remote terminal 110 and the second remote terminal 130 through the network 140.

For example, if the computer 111 is connected to the video camera 112 (whose index number is 1), the first screen 112 (whose index number is 2), and the second screen 115 (whose index number is 3), when the sharing terminal 110 shares a picture of the second screen 115 in the sharing status as determined in step S202, it is determined that there is no sharable content having an index number larger than the index number of the current shared content in step S214. That is, there is no sharable content having an index number of 4. And thus, the method proceeds to step S218 to determine whether the video camera 112 exists.

If the video camera 112 exists (Step S218: Yes), the method proceeds to step S210 and the status of the video conference returns to the video status. If the video camera 112 doesn't exist, for example if the video camera 112 has been turned off or the connection between the video camera 112 and the computer 111 has failed, whether there is sharable content having an index number smaller than the index number of the current shared content is determined in step S220. If there is a sharable content having an index number smaller than the index number of the current shared content (Step S220: Yes), the sharing terminal 110 shares the sharable content having the index number smaller than the index number of the current shared content with the first remote terminal 120 and the second remote terminal 130 as shown in step S222. If there is no sharable content having an index number smaller than the index number of the current shared content (Step S220: No), the status of the video conference may enter audio status, that is, the sharing terminal 110 only shares the audio signals captured by the microphone 113 with the first remote terminal 120 and the second remote terminal 130. Alternatively, if there is no sharable content having an index number smaller than the index number of the current shared content (Step S220: No), the video conference may end.

For example, if the sharing terminal 110 shares a picture of the second screen 115 with the remote terminals in the sharing status and the video camera 112 is disconnected from the computer 111, when it is determined that there is sharable content having an index number smaller than the index number of the current shared content in step S220, a picture of the first screen 114 will be determined to be sharable content having an index number smaller than the index number of the current shared content (Step S220: Yes). Therefore, the picture of the first screen 114 would be shared with the remote terminals in step S222. In one example, the sharable content shared with the remote terminals in step S222 is predetermined to be the one having an index number of 1.

As shown in FIG. 2, the video conference may conveniently change from video status to sharing status according to the invention, and thus a screen picture may be shared with the remote terminals immediately. In addition, if all the sharable content is finished being shared in the order of ascending index numbers, or if there is no sharable content (Step S214: No), the status may quickly return to video status (Step S210) by determining whether the video camera exists. Thus, the video conference may not be interrupted. Alternatively, if all the sharable content is finished being shared in order of ascending index numbers, the sharable content having the smallest index number would be shared with the remote terminals again to avoid having nothing to display on the screens of the remote terminals.

Figure 3:
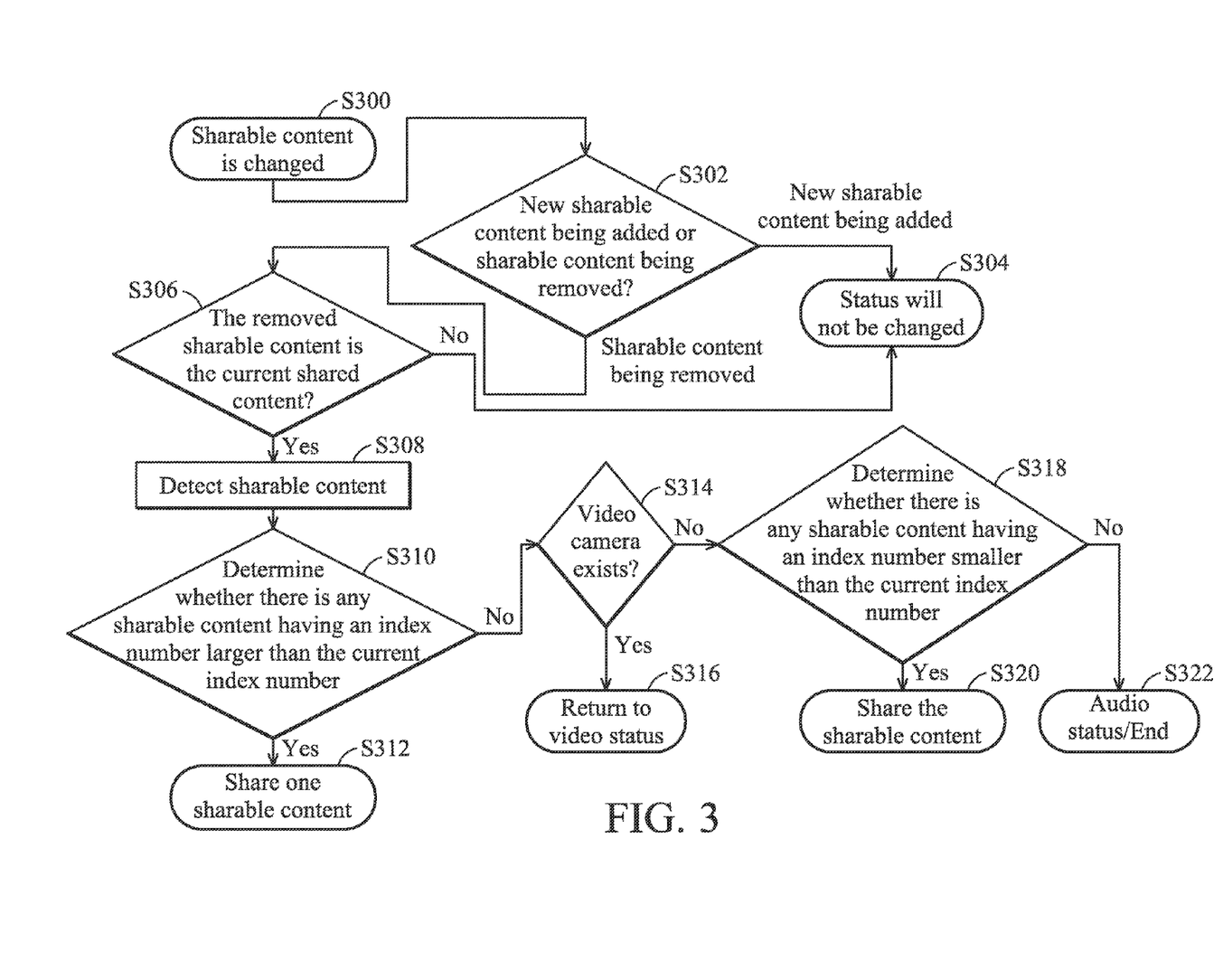
FIG. 3 is a flow chart of a method for switching shared content in a condition where any shared content is changed in a video conference.

FIG. 3 is a flow chart of a method for switching shared content in a condition where any shared content is changed in a video conference. During the video conference, if the sharing terminal detects a change of sharable content, the method proceeds to step S300. Then in step S302, whether the change is new sharable content being added, or sharable content being removed, is determined. If new sharable content is added, the status of the video conference will not be changed, as shown in step S304. If sharable content is removed, whether the removed sharable content is the current shared content shared by the sharing terminal 110 is determined in step S306. If the removed sharable content is not the current shared content (Step S306: No), as shown in step S304, the status of the video conference would not be changed. If the removed sharable content is the current shared content (Step S306: Yes), the method proceeds to step S310. The following steps S310~S322, similar to steps S214~S224 in FIG. 2, will not be described in detail herein.

Note that index numbers of sharable content may be adjusted based on whether there is any new sharable content being added or whether there is any sharable content being removed. In an example, if the computer is connected to the video camera 112 (whose original index number is 1), a first screen 114 (whose original index number is 2) and the second screen 115 (whose original index number is 3), when the video camera 112 is removed, the computer 111 may adjust the index numbers of the other sharable content. For example, when the video camera 112 is removed, the index number of the first screen 114 (whose original index number is 2) may become 1 (2-1) and the index number of the second screen 115 (whose original index number is 3) may become 2 (3-1). Thus, the picture of the first screen 114 (whose index number becomes 1) is shared with the remote terminals in step S222 in FIG. 2. After that, if a new sharable content, such as a third screen, is added, an index number of the third screen would be set to be 3 by the computer 111. Similarly, if the video camera 112 is re-connected to the computer 111, since the video camera 112 has the highest priority, the index number of the re-connected video camera 112 is set to be 1, and the index numbers of the other sharable content are adjusted accordingly. For example, the index number of the first screen 114 becomes 2 (1+1), the index number of the second screen 115 becomes 3 (2+1), and the index number of the third screen becomes 4 (3+1).

As shown in FIG. 3, when there is a change of a sharable content, shared content may still be switched fluently according to the invention. The video conference may not be interrupted when the current shared content (such as the screen picture 117) is removed. Moreover, if there is no other sharable content in the sharing terminal 110 (Step S310: No), the video conference may not be interrupted or displaying nothing on the screens of the remote terminals is avoided because of steps S314~S320.

Figure 4:
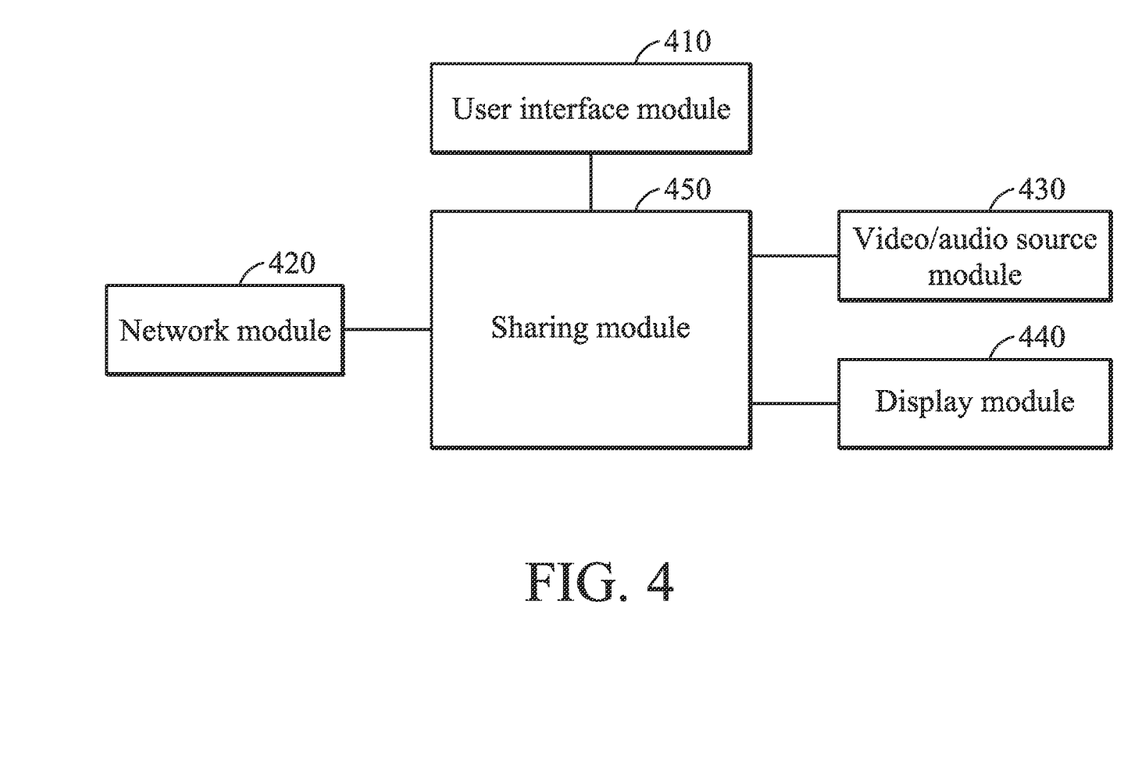
FIG. 4 is a block diagram of the sharing terminal of the video conference system according to an embodiment of the invention.

FIG. 4 is a block diagram of a sharing terminal 400 of a video conference system according to an embodiment of the invention. The sharing terminal 400 comprises a user interface module 410, a network module 420, a video/audio source module 430, a display module 440 and a sharing module 450.

The user interface module 410 provides an interface between a user and the video conference system to allow the user to operate the video conference system, such as triggering a switch event. The network module 420 is connected to a network, such as the network 140 in FIG. 1. The network is further connected to at least one remote terminal of the video conference system. The network module 420 may be a network interface card in a computer. The video/audio source module 430 is connected to a video camera and/or a microphone, such as the video camera 112 and the microphone 113 in FIG. 1. The video/audio source module 430 may be a video interface card and an audio interface card in a computer. The display module 440 is connected to at least one display device, such as the first screen 114 and the second screen 115 in FIG. 1. The display module 440 may be a display card in a computer. The sharing module 450 retrieves video signals captured by the video camera and/or audio signals received by the microphone. The sharing module 450 may also retrieve a display content displayed on at least one display device, such as a screen picture, a window, an extended desktop, an application and other pictures of a main screen or a display device other than the main screen.

The sharing module 450 has a video status and a sharing status. As described above, when in video status, the sharing module 450 shares the retrieved video signals with at least one remote terminal through the network module 420. When in sharing status, the sharing module 450 shares the retrieved display content with at least one remote terminal through the network module 420.

Figure 5:
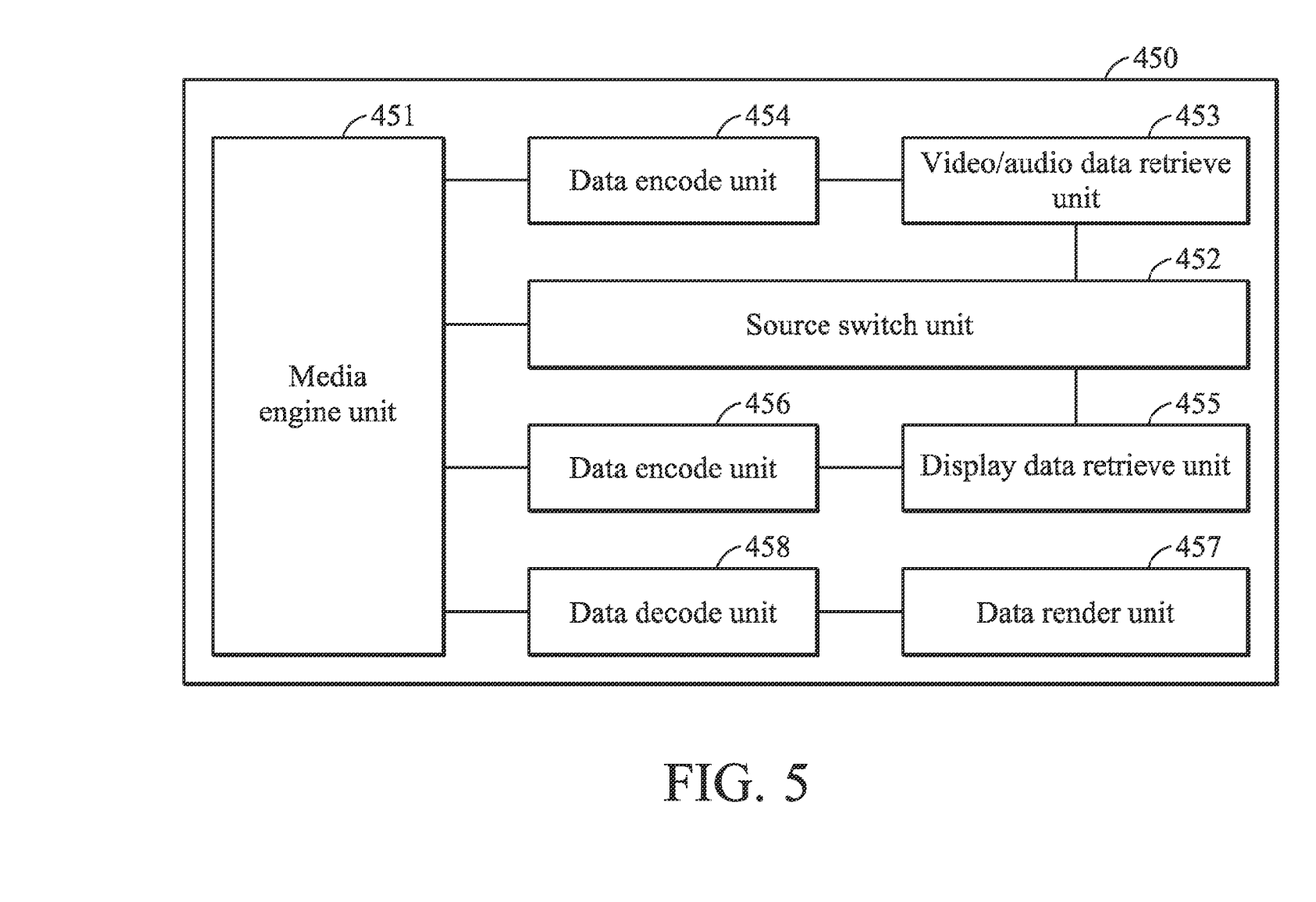
FIG. 5 is a block diagram of a sharing module according to an embodiment of the invention.

FIG. 5 is a block diagram of the sharing module 450 according to an embodiment of the invention. The sharing module 450 comprises a media engine unit 451, a source switch unit 452, a video/audio data retrieve unit 453, a data encode unit 454, a display data retrieve unit 455, a data encode unit 456, a data render unit 457, and a data decode unit 458.

The video/audio data retrieve unit 453, coupled to the video/audio source module 430, retrieves video signals of the video camera connected to the video/audio source module 430 and/or audio signals of the microphone connected to the video/audio source module 430. The data encode unit 454 performs processing and encoding on the video signals and/or the audio signals retrieved by the video/audio data retrieve unit 453.

The display data retrieve unit 455, coupled to the display module 440, retrieves the display content of at least one display device connected to the display module 440, such as a screen picture, a window or an extended desktop of the main screen or a screen picture, a picture of a window or an application or other pictures of a display device other than the main screen. The data encode unit 456 performs encoding on the retrieved display content retrieved by the display data retrieve unit 455.

The media engine unit 451 performs processing on the encoded video signals and/or the encoded audio signals encoded by the data encode unit 454, performs processing on the encoded display content encoded by the data encode unit 456 and transmits the processed data to at least one remote terminal through the network module 420.

The source switch unit 452 controls a data pathway. The data pathway depends on statuses as following. (1) In video status, the video/audio data retrieve unit 453 retrieves video signals and/or audio signals, the data encode unit 454 performs encoding on the retrieved video signals and/or the retrieved audio signals retrieved by the video/audio data retrieve unit 453, and the media engine unit performs processing on the encoded video signals and/or the encoded audio signals encoded by the data encode unit 454 and transmits the processed video signals and/or the processed audio signals to at least one remote terminal through the network. (2) In the sharing status, the display data retrieve unit 455 retrieves a display content, the data encode unit 456 performs encoding on the retrieved display content retrieved by the display data retrieve unit 455, and the media engine unit 451 performs processing on the encoded display content encoded by the data encode unit 456 and shares the processed display content with at least one remote terminal through the network module 420.

In addition, the media engine unit 451 further receives data transmitted by at least one remote terminal through the network via the network module 420 and performs processing on the received data. The data decode unit 458 performs decoding on the received data. The data render unit 457 transmits the decoded data to the display module 440 so as to display the decoded data on the display device connected to the display module 440. Modules or units described above may take the form of a processor or a processing unit.

Methods and systems of the present disclosure, or certain aspects or portions of embodiments thereof, may take the form of a program code (i.e., instructions) embodied in media, such as floppy diskettes, CD-ROMS, hard drives, firmware, or any other non-transitory machine-readable storage medium, wherein, when the program code is loaded into and executed by a machine such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing an embodiment of the disclosure. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for switching shared content in a video conference, comprising:
   determining a status of the video conference when a sharing terminal triggers a switch event in the video conference;
   if the status is a video status, determining whether the sharing terminal has at least one sharable content, if so, sharing one of at least one sharable content with at least one remote terminal in the video conference by the sharing terminal, if not, making the status remain the video status; and
   if the status is a sharing status and the sharing terminal shares a content having a first index number, determining whether the sharing terminal has a first sharable content having an index number larger than the first index number, if so, sharing the first sharable content with at least one remote terminal by the sharing terminal.

2. The method as claimed in claim 1, further comprising:
   when the status is the sharing status, if the sharing terminal doesn't have the first sharable content, determining whether a video camera of the sharing terminal exists;
   if the video camera exists, making the video conference return to the video status; and
   if the video camera doesn't exist, determining whether the sharing terminal has a second sharable content having an index number smaller than the first index number, and when the sharing terminal has the second sharable content, sharing the second sharable content with at least one remote terminal by the sharing terminal.

3. The method as claimed in claim 2, wherein when the sharing terminal doesn't have the second sharable content, making the video conference enter an audio status or ending the video conference.

4. The method as claimed in claim 3, further comprising:
   detecting whether a sharable content is removed;
   if so, determining whether the sharable content being removed is a current shared content, wherein the current shared content has a second index number; and
   if the sharable content being removed is the current shared content, determining whether the sharing terminal has a third sharable content having an index number larger than the second index number, and if so, sharing the third sharable content with at least one remote terminal by the sharing terminal.

5. The method as claimed in claim 4, further comprising:
   if the sharing terminal doesn't have the third sharable content, determining whether the video camera exists;
   if the video camera exists, making the video conference return to the video status;
   if the video camera doesn't exist, determining whether the sharing terminal has a fourth sharable content having an index number smaller than the second index number, and when the sharing terminal has the fourth sharable content, sharing the fourth sharable content with at least one terminal doesn't have the fourth sharable content, making the video conference enter the audio status or ending the video conference.

6. A video conference system, comprising a sharing terminal and at least one remote terminal, wherein the sharing terminal and at least one remote terminal are connected to each other through a network to perform a video conference, wherein the sharing terminal comprises:
   a user interface module, wherein a user operates the video conference system through the user interface module;
   a network module, coupled to the network;
   a video/audio source module, coupled to a video camera and/or a microphone;
   a display module, coupled to at least one display device; and
   a sharing module, retrieving video signals captured by the video camera and/or audio signals received by the microphone through the video/audio source module and retrieving a display content displayed on at least one display device through the display module, wherein the sharing module has a video status and a sharing status, and when in the video status, the sharing module shares the retrieved video signals with at least one remote terminal via the network through the network module, and when in the sharing status, the sharing module shares the retrieved display content with at least one remote terminal through the network, wherein an index number of the display content is a first index number;
   wherein when the user interface module receives a switch event, the sharing module determines the status of the sharing module,
   if the status is the video status, the sharing module determines whether the display module has at least one sharable content, if so, the sharing module shares one of at least one sharable content with at least one remote terminal through the network, if not, the sharing module keeps in the video status, and
   if the status is the sharing status, the sharing module determines whether there is a first sharable content having an index number larger than the first index number, and if so, the sharing module shares the first sharable content with at least one remote terminal through the network.

7. The system as claimed in claim 6, wherein when in the sharing status, if the sharing module doesn't have the first sharable content, whether the video/audio source module is connected to the video camera is determined, and
   if so, the sharing module returns to the video status, and
   if not, the sharing module determines whether there is a second sharable content having an index number smaller than the first index number, and if so, the sharing module shares the second sharable content with at least one remote terminal.

8. The system as claimed in claim 7, wherein when there is no second sharable content, the sharing module enters an audio status or the sharing module ends the video conference.

9. The system as claimed in claim 8, wherein the sharing module further detects whether a sharable content of the display module is removed.
   if so, the sharing module determines whether the sharable content being removed is a current shared content, wherein the current shared content has a second
   if the sharable content being removed is the current shared content, the sharing module determines whether there is a third sharable content having an index number larger than the second index number, if so, the sharing module shares the third sharable content with at least one remote terminal through the network.

10. The system as claimed in claim 9, wherein if the display module doesn't have the third sharable content, the sharing module determines whether the video camera is connected to the video/audio source module, if so, the sharing module returns to the video status, if not, the sharing module determines whether there is a fourth sharable content having an index number smaller than the second index number, if so, the sharing module shares the fourth sharable content with at least one remote terminal, and if not, the sharing module enters the audio status or ends the video conference.

* * * * *